(12) United States Patent
Steele et al.

(10) Patent No.: US 8,214,634 B1
(45) Date of Patent: *Jul. 3, 2012

(54) ESTABLISHING TRUST VIA AGGREGATE PEER RANKING

(75) Inventors: Joseph Steele, Danville, CA (US); Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1277 days.

This patent is subject to a terminal disclaimer.

(21) Appl. No.: 11/359,238

(22) Filed: Feb. 21, 2006

(51) Int. Cl.
*H04L 29/06* (2006.01)

(52) U.S. Cl. ............. 713/152; 713/156; 726/10; 726/5; 726/3

(58) Field of Classification Search .................. 713/156, 713/155, 178; 380/229, 232, 247, 250, 258; 705/67

See application file for complete search history.

(56) References Cited

U.S. PATENT DOCUMENTS

| | | | | |
|---|---|---|---|---|
| 6,212,634 B1 * | 4/2001 | Geer et al. | ..................... | 713/156 |
| 6,510,516 B1 * | 1/2003 | Benson et al. | ................ | 713/167 |
| 6,865,674 B1 * | 3/2005 | Mancini et al. | ............... | 713/157 |
| 7,213,047 B2 * | 5/2007 | Yeager et | ...................... | 709/202 |
| 7,290,133 B1 * | 10/2007 | Montgomery | ................ | 713/156 |
| 2007/0022296 A1 * | 1/2007 | Caverly et al. | ................ | 713/178 |

OTHER PUBLICATIONS

Sye Loong and Emil Lupu. "Peer Trust in Mobile Ad-hoc Communities." pp. 1-14. Department of Computing. Imperial College. London, U.K.

* cited by examiner

*Primary Examiner* — Pramila Parthasarathy
(74) *Attorney, Agent, or Firm* — Van Pelt, Yi & James LLP

(57) ABSTRACT

Validating a certificate is disclosed. Whether the certificate was previously determined to be valid by one or more peer entities is determined. The certificate is validated based at least in part on the determination.

31 Claims, 6 Drawing Sheets

| Group | User | Trust Level | Cert / | ... |
|---|---|---|---|---|
| Medical | Alice | 2 | Y | ... |
| Admin | Bob | 3 | Y | ... |
| (None) | Eve | 1 | N | ... |
| ⋮ | ⋮ | ⋮ | ⋮ | |

FIG. 6

ESTABLISHING TRUST VIA AGGREGATE PEER RANKING

BACKGROUND OF THE INVENTION

Public key cryptography requires using a trusted public key. Certificates are often used in establishing trust of a given public key. Verifying a certificate typically requires confirming the certificate is signed by a trust anchor. The list of trust anchors is usually preconfigured in a system and often difficult to modify. When securely validating a certificate of an unknown certificate signer, Trust Anchor Certificate Practice Statement (CPS) is obtained using a Uniform Resource Identifier (URI) embedded in the certificate. The CPS is reviewed by knowledgeable personnel, and if the CPS is deemed acceptable, the signer is trusted. This process of manually reviewing the CPS for each unknown signer is inefficient. Therefore, there exists a need for an efficient way to validate certificates not signed by an established trust anchor.

BRIEF DESCRIPTION OF THE DRAWINGS

Various embodiments of the invention are disclosed in the following detailed description and the accompanying drawings.

FIG. 6 is a chart illustrating an embodiment of data associated with a previous certificate validity determination made by entities.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Validating a certificate is disclosed. In some embodiments, the certificate is validated based at least in part on whether the certificate was previously determined to be valid by another entity. In various embodiments, feedback data from a peer network is at least in part used to determine whether to trust the certificate. Examples of the peer network include one or more of the following: a single server, a network of servers, a peer-to-peer network, an instant message network, a social network service, a chat service, a newsgroup, and a mailing list.

Figure 1:
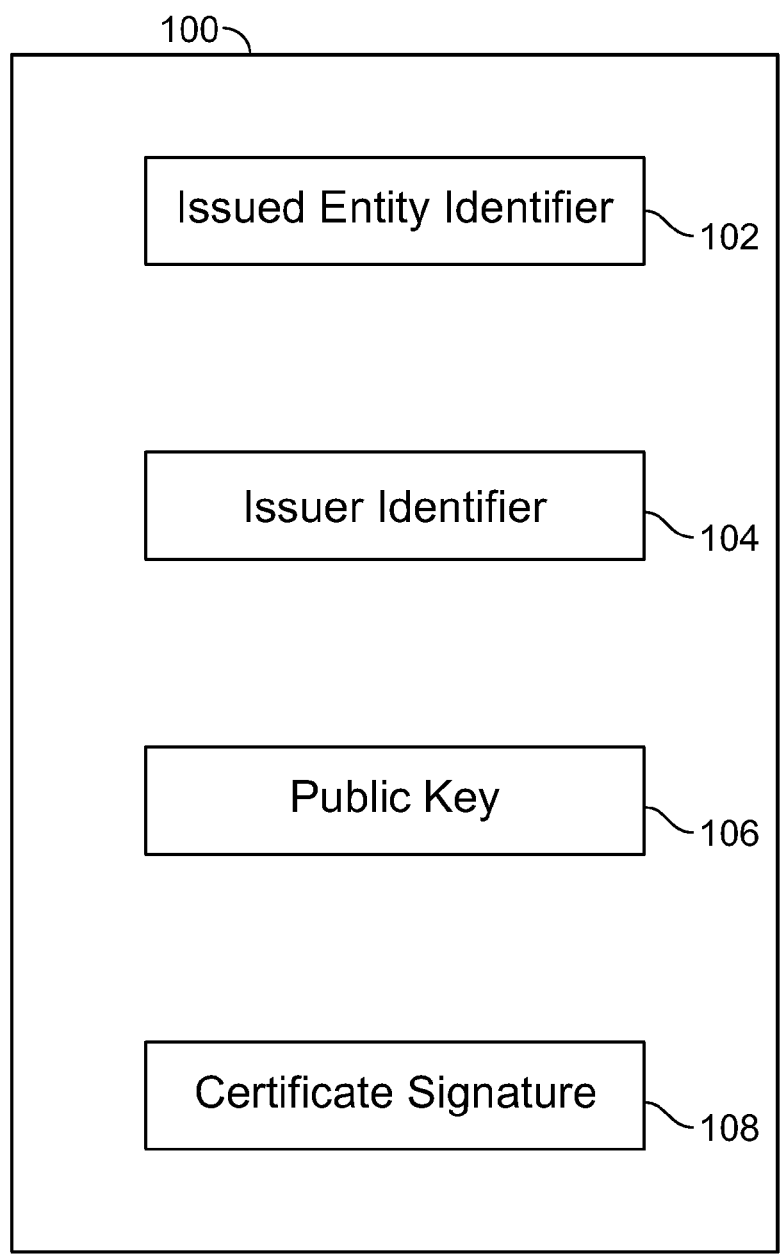
FIG. 1 is a block diagram illustrating an embodiment of a certificate.

FIG. 1 is a block diagram illustrating an embodiment of a certificate. Certificate 100, includes issued entity identifier 102, issuer identifier 104, public key 106, and certificate signature 108. Certificate 100 is merely an illustrative example. Certificate 100 may include other objects and/or one or more objects shown in FIG. 1. Issued entity identifier 102 includes an identifier associated with an entity to which certificate 100 is issued. Issuer identifier 104 includes an identifier associated with an entity that has issued certificate 100. The issuer can be same as the issued entity (e.g., self-signed certificate) or a different authority attesting that public key 106 belongs to the issued entity. In some cases, the issuer is a trusted anchor such as a trusted Certificate Authority (CA) (e.g. VeriSign of Mountain View, Calif. or CAcert of Australia). Public key 106 includes a cryptographic key that can be used to encode messages for the issued entity. Certificate Signature 108 includes a signature of the issuer that can be used at least in part to verify the authenticity of the certificate. For example, a public key of the issuer is used to decrypt the signature to verify the certificate was issued by the issuer. In some embodiments, verifying certificate 100 includes verifying certificate signature 108 and ensuring issuer 104 is associated with a trusted anchor. In various embodiments, a chain of certificates linked by the issued entity identifier and the issuer identifier is built until an issuer identifier associated with a trusted anchor is found. In some embodiments, a cross certificate allows trust for one trust anchor to be extended to a certificate chain based on another trust anchor. If certificate 100 is not associated with a trust anchor, further verification of the certificate may be required.

Figure 2:
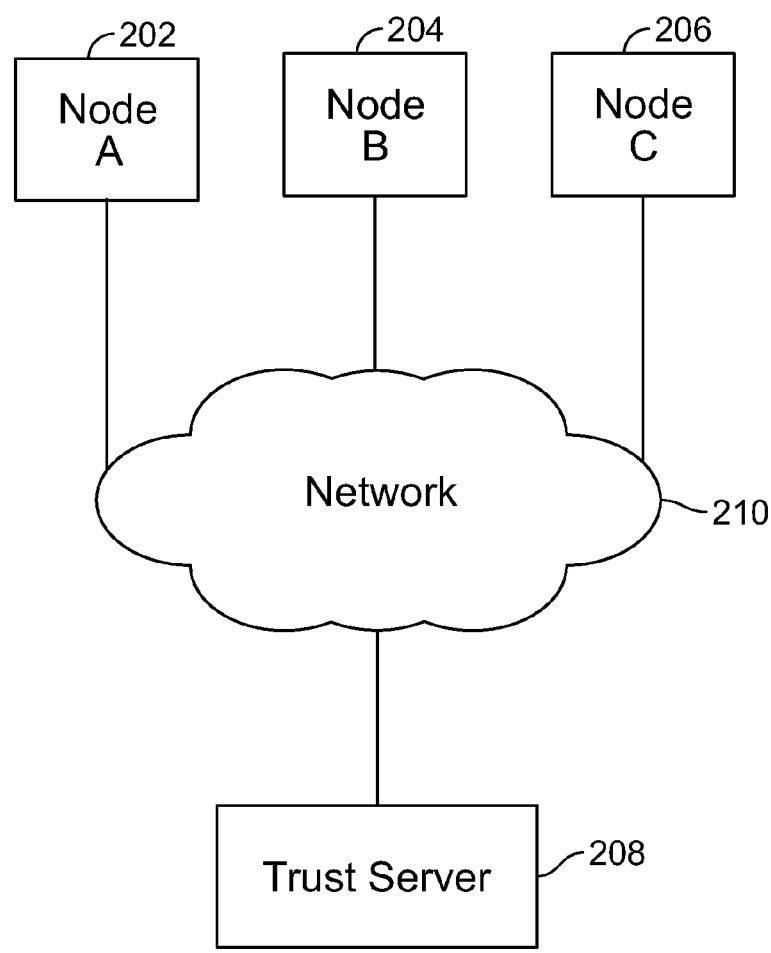
FIG. 2 is a block diagram illustrating a network environment.

FIG. 2 is a block diagram illustrating a network environment. Node A 202, node B 204, node C 206, and trust server 208 are connected together through network 210. Network 210 comprises a public or private network and/or combination thereof, for example an Ethernet, serial/parallel bus, intranet, Internet, Local Area Network (LAN), Wide Area Network (WAN), and other forms of connecting multiple systems and or groups of systems together. In various embodiments, any number of nodes may exist. Examples of a node include a PC, a server, a web server, and any networked system. When node A 202 wishes to communicate with node B 204 through network 210 using public-key cryptography, a public key of node B 104 is verified using a certificate. In some embodiments, the certificate is certificate 100 of FIG. 1. In some embodiments if the certificate is not associated with a trust anchor, trust server 208 is queried by node A 202. Trust server 208 returns data that can be at least in part used to determine if the certificate issuer can be trusted. In some embodiments, trust server 208 returns data associated with whether the certificate of node B 204 was previously determined to be valid by one or more other nodes (e.g., node C 206). In various embodiments, trust server 208 includes feedback and/or rating data associated with a certificate. In some embodiments, trust server 208 is optional. Rather than obtaining data associated with the certificate from trust server 208, one or more other nodes (e.g., peer network) are queried. In some embodiments, more than one trust server is queried.

Figure 3:
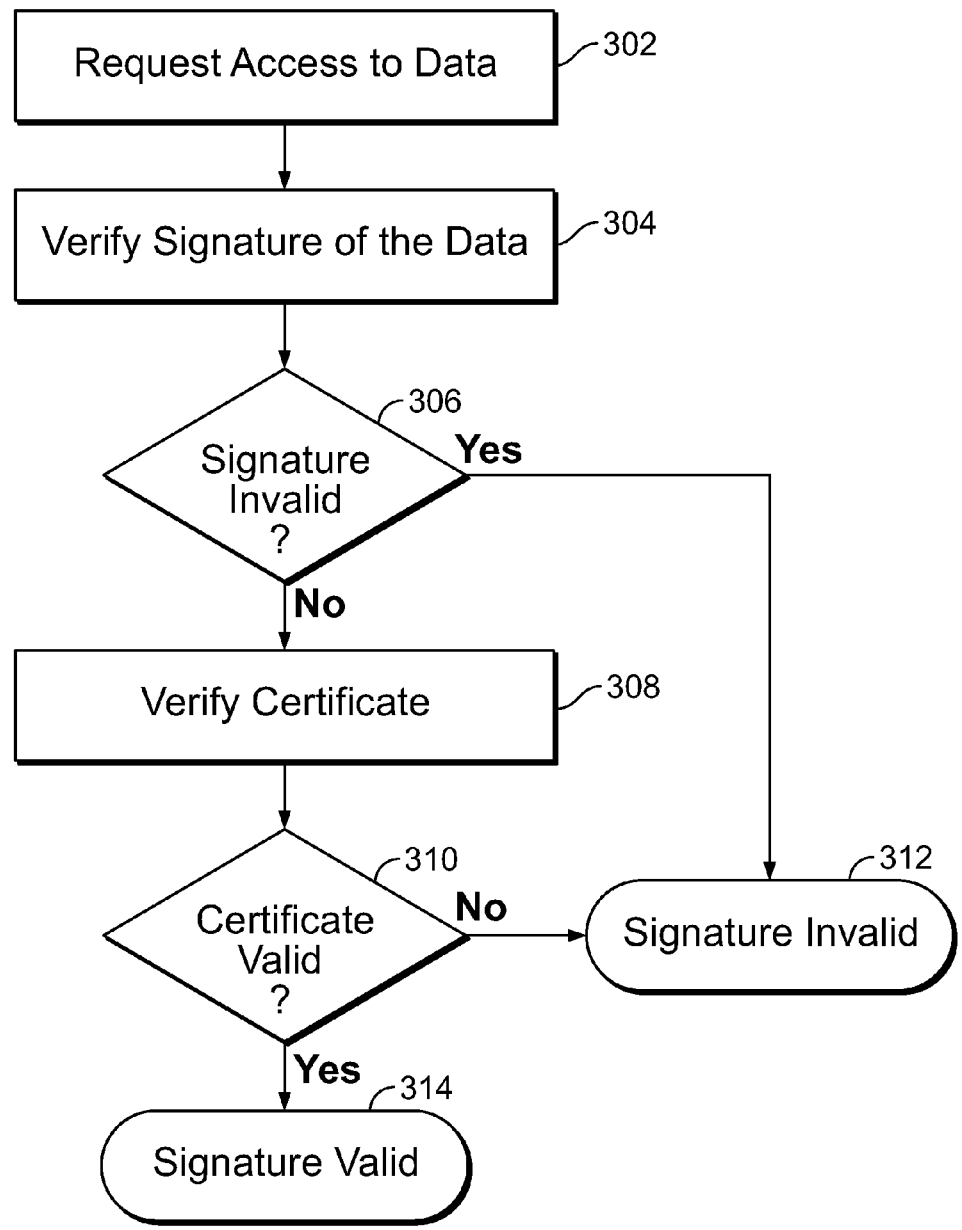
FIG. 3 is a flow chart illustrating an embodiment of a process for validating a signature for data.

FIG. 3 is a flow chart illustrating an embodiment of a process for validating a signature for data. In some embodiments, the process is at least in part implemented in a node of FIG. 2. In various embodiments, the process is at least in part implemented in a content editing, viewing, and/or managing application. For example, the process is at least partly implemented in a document editing, viewing, and/or managing application such as Adobe® Acrobat®. At 302, access to the data is requested. In various embodiments, the data includes content data. Examples of content data include, a Portable Document Format (PDF) file, a word processing document, a spread sheet, a presentation, visual graphic content (e.g. chart, graph, map, drawing, image content), audio content, multimedia (e.g. video) content, Extensible Markup Language (XML) content, Hyper Text Mark-Up Language (HTML) content, web based content, script content, and database content. At 304, a signature of the data is verified. In some embodiments, verifying the signature of the data includes hashing content of the data, decrypting the signature of the data using a public key of the signer, and matching the produced hash of the data with the decrypted signature. In some embodiments, if the produced hash of the data and the decrypted signature do not match, the signature is invalid. At 306, if the signature is determined to be invalid, at 312, signature invalid is reached. At 306, if the signature is not determined to be invalid, at 308, a certificate is verified. In some embodiments, verifying the certificate includes verifying that the public key used at 304 to verify the signature of the data is the correct public key. For example, verifying the certificate includes verifying the certificate signature and verifying the certificate issuer can be chained up to a trusted anchor. In some embodiments, the certificate is determined to valid when the certificate signature in the certificate is valid and the certificate is associated with a trust anchor. At 310, if the certificate is determined to be not valid, at 312, signature invalid is reached. At 310 if the certificate is determined to be valid, at 314, signature valid is reached.

Figure 4:
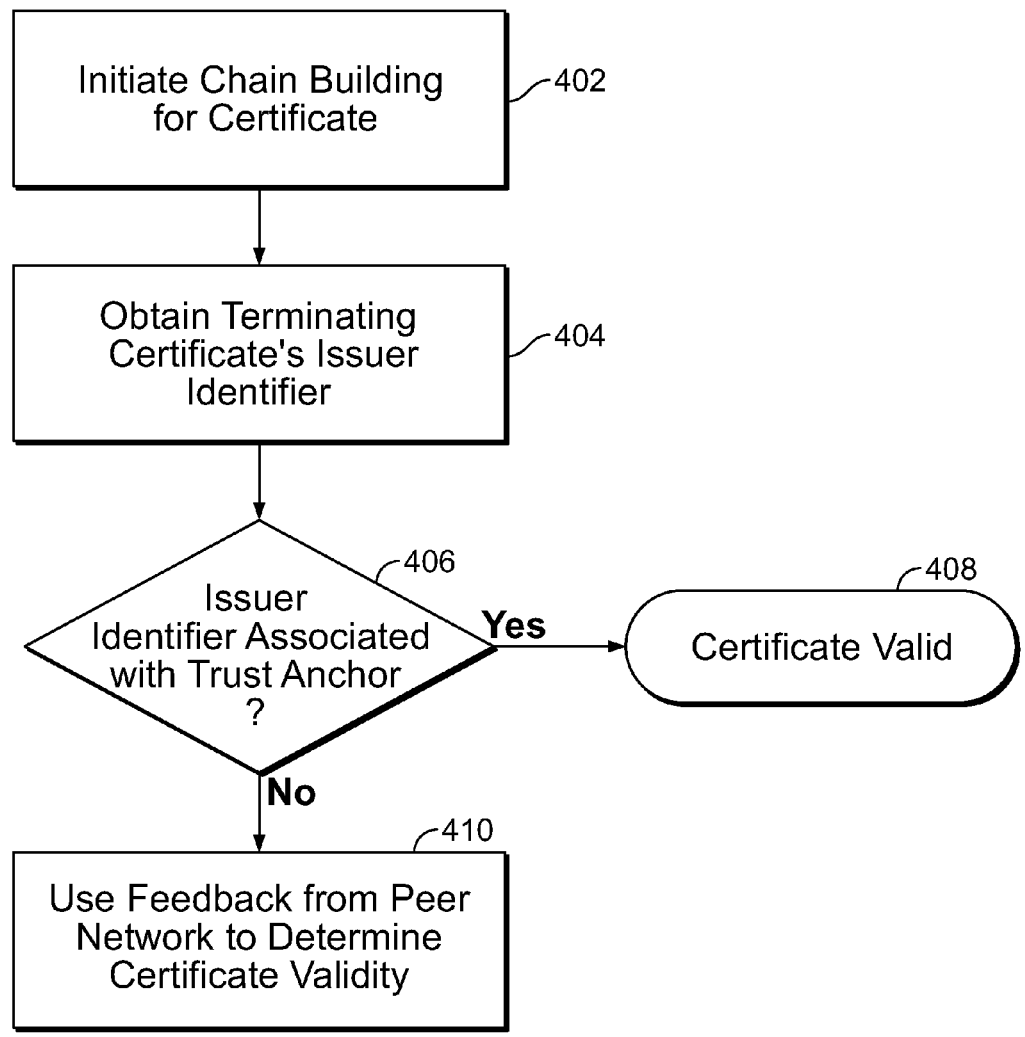
FIG. 4 is a flow chart illustrating an embodiment of a process for verifying a certificate.

FIG. 4 is a flow chart illustrating an embodiment of a process for verifying a certificate. In some embodiments, the process of FIG. 4 is included in 308 of FIG. 3. In some embodiments, a certificate signature included in the certificate is verified before the process of FIG. 4. At 402, chain building for the certificate is initiated. Chain building includes following a chain of one or more related certificates until either the chain ends or a self-signed certificate is reached. In some cases, the certificate chain is not built, and the given certificate is the terminating certificate. At 404, the terminating certificate's issuer identifier is obtained. At 406, if the issuer identifier is associated with a trust anchor, at 408, certificate valid is reached. At 406, if the issuer identifier is not associated with a trust anchor, at 410, feedback from a peer network is used to determine the validity of the certificate. For example, information associated with whether one or more peers has previously trusted the certificate is used to determine the certificate's validity. In some embodiments, before using the feedback from the peer network, one or more previous certificate validity determinations is used at least in part to determine the validity of the certificate. In some embodiments if at least one certificate in the certificate chain was trusted before, the certificate is trusted.

Figure 5:
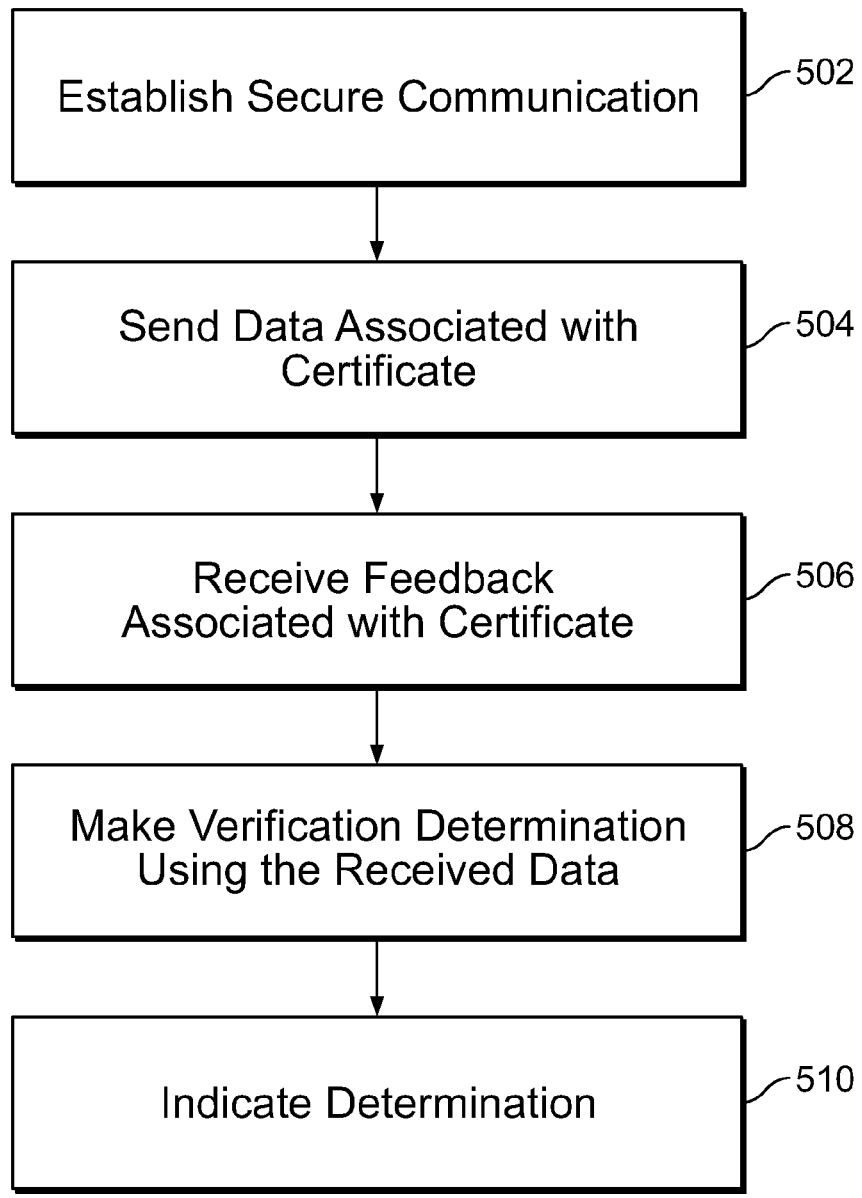
FIG. 5 is a flow chart illustrating an embodiment of a process for making a verification determination associated with a certificate.

FIG. 5 is a flow chart illustrating an embodiment of a process for making a verification determination associated with a certificate. In some embodiments, the process of FIG. 5 is included in 410 of FIG. 4. At 502, secure communication is established. In some embodiments the secure communication is established with one or more trust servers. The trust server is associated with retrieval of certificate validity related data. For example, a trust server stores feedback data associated with certificates. In some embodiments, one or more certificate security policies are established on the trust server. An example of the certificate security policy includes a list of trust anchors specified by an administrator. In various embodiments, the trust server is associated with an existing peer-to-peer network, instant message network, social network service, chat service, newsgroup, and/or mailing list. In some embodiments, the secure communication is established with a peer network. An example of a peer network includes one or more network nodes other than the node directly associated with the entity verifying the certificate. Other examples of the peer network include one or more of the following: a single server, a network of servers, a peer-to-peer network, an instant message network, a social network service, a chat service, a newsgroup, and a mailing list. At 504, data associated with the certificate is sent. The sent data may include the actual certificate, a hash (e.g. SHA-1) of at least a portion of the certificate, a certificate identifier, and/or a certificate issuer identifier. In some embodiments by sending the hash and/or the identifier instead of the actual certificate, communication bandwidth is saved. The data may be sent to one or more peers and/or one or more trust servers.

At 506, feedback associated with the certificate is received. The feedback includes zero or more responses associated with the trustworthiness of the certificate. In some embodiments, the feedback includes data associated with whether the certificate and/or the certificate issuer was previously determined to be valid by another entity (e.g. peer). The feedback may be immediately received or received over a period of time from various peers. In some embodiments, responses in the feedback are not homogenous. For examples, one response contains more/less data than another response. In some embodiments, the received data includes one or more of the following: a Boolean value associated with the certificate's validity, one or more reasons for a previous validity decision, number of entities that determined the certificate/issuer to be valid/invalid, confidence level of the determination made by the entities, reliability of the entities, relationship of the entities, and a profile of the entities. At 508, verification determination is made using the received data. In some embodiments, the verification determination is made by calculating a statistical value based at least in part on the received data. For example, each previous validity determination of an entity is weighted differently depending upon the type of the entity and/or a weight value associated with the entity. In some embodiments, a weight value is based on time. For example, more recent data is weighted more significant. In some cases, at least a portion of the received data is not used in making the verification determination. For example, only feedback from peers within two degrees of connection and with a reliability rating greater than a specified value is used in the verification determination. In various embodiments, the validity determination is made at least in part using an indication received by a user. For example, the user is presented with the feedback data and prompted to make a validity decision on the certificate. At 510, the determination is indicated. Examples of the indication include, communicating the determination to a trust server/peer network and/or storing the indication for retrieval by other peers.

FIG. 6 is a chart illustrating an embodiment of data associated with a previous certificate validity determination made by entities. In some embodiments, the data shown in table 600 is stored in trust server 208 of FIG. 2, a node of FIG. 2, and/or associated with a peer network. The data may be stored in a table or any other appropriate format. Each row of table 600 is associated with a single entity (e.g. peer). "Group" column of the table is associated with a category group associated with an entity. For example, when making a validity determination of a certificate, only previous validity determination data only from one or more specific groups may be used and/or data associated with specific groups may be weighted more/less. The "User" column of the table includes identifiers associated with the entities. The "Trust Level" column of the table includes trust reliability weight values associated with the entities. For example, entities that utilize stricter security policies can be assigned a higher trust value than entities utilizing minimal security policies. The "Cert 1" column of table 600 includes values associated with a previous validity determination made by the entities on a specific certificate. In some embodiments, the "Cert 1" column includes values associated with more than one previous validity decision and/or a confidence level of a previous validity determination. Other columns may exist in table 600. The table values shown are merely an illustrative example. The data in table 600 may be stored in one or more locations. For example, data in the first row is stored on a medical group trust server and data in the third row is stored on a separate network node.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining whether a certificate is associated with a trust anchor;
   in the event that it is determined that the certificate is associated with the trust anchor, determining that the certificate is valid;
   in the event that it is determined that the certificate is not associated with the trust anchor:
     determining whether the certificate was previously determined to be valid by one or more peer entities, including:
       sending data associated with the certificate;
       receiving feedback data associated with one or more previous certificate validity determinations made by one or more peer entities; and
     validating the certificate based at least in part on the determination;
   wherein the feedback data is obtained from a trust server that stores information regarding two or more previous certificate validity determinations made by two or more peer entities.

2. A method as recited in claim 1, wherein the one or more peer entities is one or more entities other than a validating entity attempting to validate the certificate.

3. A method as recited in claim 1, wherein the certificate is associated with public key cryptography.

4. A method as recited in claim 1, wherein the one or more peer entities includes one or more entities included in a peer-to-peer network.

5. A method as recited in claim 1, wherein the one or more peer entities includes one or more entities included in one or more of the following: an instant message network, a social network service, a chat service, a newsgroup, and a mailing list.

6. A method as recited in claim 1, wherein determining whether the certificate was previously determined to be valid includes querying one or more peer network nodes.

7. A method as recited in claim 1, wherein determining whether the certificate was previously determined to be valid includes querying a server associated with certificate validation.

8. A method as recited in claim 1, wherein determining whether the certificate was previously determined to be valid includes computing a hash value of at least a portion of the certificate used to identify the certificate.

9. A method as recited in claim 8, wherein validating the certificate includes presenting data associated with the responses to a user and prompting the user for an input associated with the validity of the certificate.

10. A method as recited in claim 1, wherein a statistical value based at least in part on the responses is at least in part used to validate the certificate.

11. A method as recited in claim 10, wherein the statistical value is calculated using one or more weight values associated the responses.

12. A method as recited in claim 1, wherein determining whether the certificate was previously determined to be valid includes receiving one or more reasons for a previous validity decision by the peer entities.

13. A method as recited in claim 1, wherein determining whether the certificate was previously determined to be valid includes receiving number of peer entities that previously determined the certificate to be valid.

14. A method as recited in claim 1, wherein determining whether the certificate was previously determined to be valid includes receiving number of peer entities that previously determined the certificate issuer to be valid.

15. A method as recited in claim 1, wherein determining whether the certificate was previously determined to be valid includes receiving one or more confidence levels of the previous validity determination made by the peer entities.

16. A method as recited in claim 1, wherein determining whether the certificate was previously determined to be valid includes receiving reliability information of the peer entities.

17. A method as recited in claim 1, wherein determining whether the certificate was previously determined to be valid includes receiving a profile of the peer entities.

18. A method as recited in claim 1, further comprising indicating information associated with the validity of the certificate to a trust server or a peer network node.

19. A method as recited in claim 1, wherein determining whether the certificate was previously determined to be valid is performed only after verifying a signature included in the certificate is valid.

20. A method as recited in claim 1, wherein validating the certificate is based at least in part on one or more previous certificate validity determinations of a validating entity.

21. A method as recited in claim 1, wherein determining whether the certificate was previously determined to be valid is performed when attempting to access encrypted data associated with a cryptographic key included in the certificate.

22. A method as recited in claim 21, wherein the encrypted data includes one or more of the following: a Portable Document Format file, a word processing document, a spreadsheet, a presentation, visual graphic content, audio content, multimedia content, Extensible Markup Language content, Hyper Text Mark-Up Language content, web based content, script content, and database content.

23. A method as recited in claim 1, wherein the feedback data includes an indication of one or more groups to which one or more of the peer entities belongs.

24. A method as recited in claim 1, wherein the feedback data includes trust level data associated with one or more of the peer entities.

25. A method as recited in claim 1, wherein the feedback data includes an indication of whether or not the certificate was previously determined to be valid by one or more of the peer entities.

26. A system, comprising:
a processor; and
a memory coupled with the processor, wherein the memory is configured to provide the processor with instructions which when executed cause the processor to:
determine whether a certificate is associated with a trust anchor;
in the event that it is determined that the certificate is associated with the trust anchor, determine that the certificate is valid;
in the event that it is determined that the certificate is not associated with the trust anchor:
determine whether the certificate was previously determined to be valid by one or more peer entities, including:
send data associated with the certificate;
receive feedback data associated with one or more previous certificate validity determinations made by one or more peer entities; and
validate the certificate based at least in part on the determination;
wherein the feedback data is obtained from a trust server that stores information regarding two or more previous certificate validity determinations made by two or more peer entities.

27. A system as recited in claim 26, wherein the one or more peer entities is one or more entities other than a validating entity attempting to validate the certificate.

28. A system as recited in claim 26, wherein the memory is configured to determine whether the certificate was previously determined to be valid including by querying one or more peer network nodes.

29. A computer program product, the computer program product being embodied in a non-transitory computer readable medium and comprising computer instructions for:
determining whether a certificate is associated with a trust anchor;
in the event that it is determined that the certificate is associated with the trust anchor, determining that the certificate is valid;
in the event that it is determined that the certificate is not associated with the trust anchor:
determining whether the certificate was previously determined to be valid by one or more peer entities, including:
sending data associated with the certificate;
receiving feedback data associated with one or more previous certificate validity determinations made by one or more peer entities; and
validating the certificate based at least in part on the determination=
wherein the feedback data is obtained from a trust server that stores information regarding two or more previous certificate validity determinations made by two or more peer entities.

30. A computer program product as recited in claim 29, wherein the one or more peer entities is one or more entities other than a validating entity attempting to validate the certificate.

31. A computer program product as recited in claim 29, wherein determining whether the certificate was previously determined to be valid includes querying one or more peer network nodes.

* * * * *